Aug. 16, 1927.
F. A. LUTHY
1,639,140
WHEEL PULLER
Filed May 2, 1925
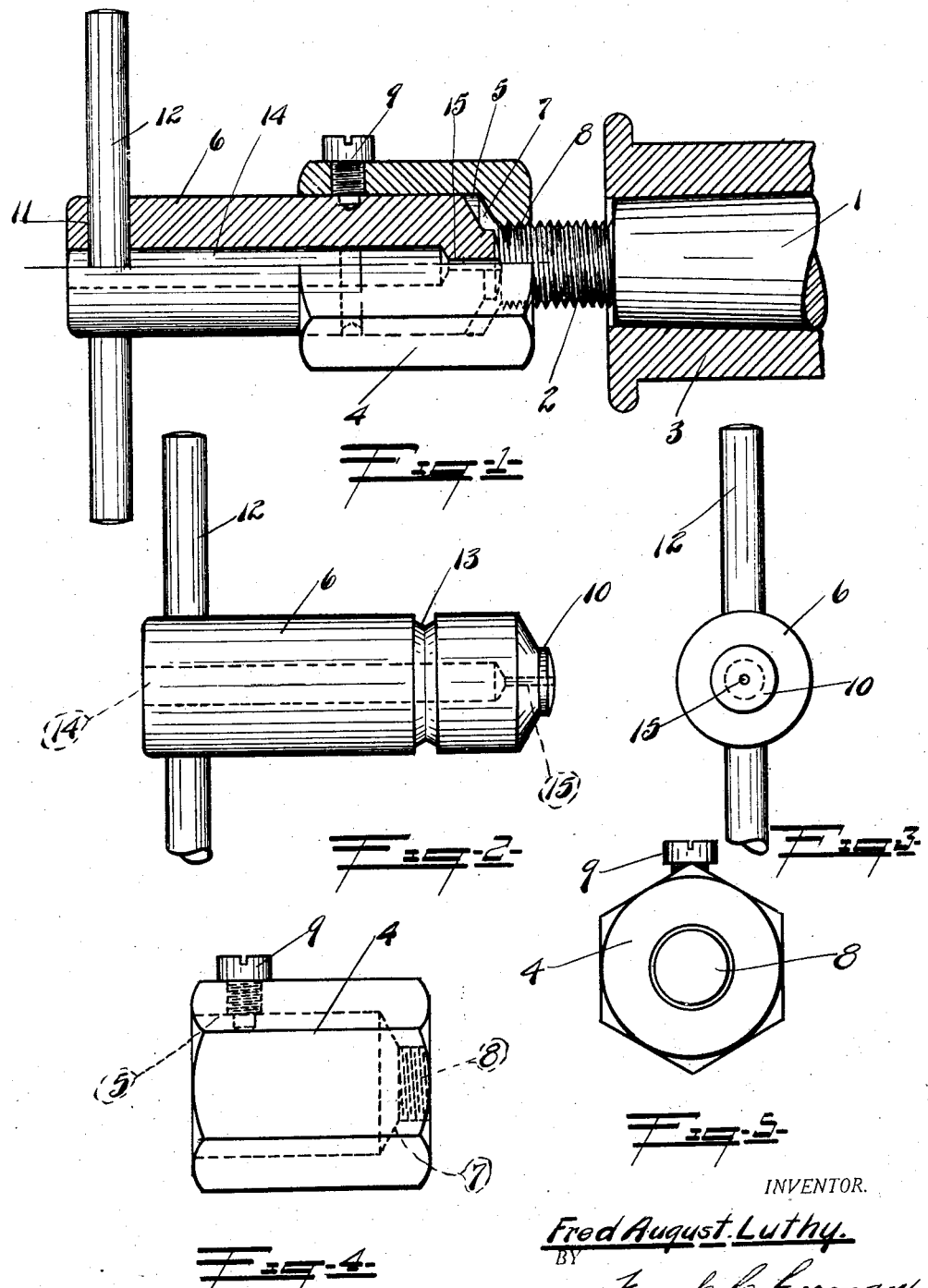
INVENTOR.
Fred August Luthy.
BY Frank C. Firman
ATTORNEY.

Patented Aug. 16, 1927.

1,639,140

UNITED STATES PATENT OFFICE.

FRED AUGUST LUTHY, OF JACKSON, MICHIGAN.

WHEEL PULLER.

Application filed May 2, 1925. Serial No. 27,457.

This invention relates to wheel pullers for removing wheels from automobiles and similar vehicles.

One object is to design a tool having a removable central driving or impact member which is adapted to fit a number of sockets, said sockets being threaded to fit the axles of the various makes of automobiles. Another object is to design a wheel puller which can also be used for removal or replacement of the automobile hub caps, the shaft nut, the front wheel nut and cone, and various other parts. A further object is to provide a simple and substantial tool of rigid construction which will be economical to manufacture and easy to operate.

With the above and other objects in view, the present invention consists in the combination and arrangement of parts, hereinafter more fully described, illustrated in the accompanying drawings, and particularly pointed out in the appended claims, it being understood that changes may be made in the form, size, proportion and minor details of construction, without departing from the spirit or sacrificing any of the advantages of the invention.

In the drawing.

Fig. 1 is a part sectional side view of my improved wheel puller showing it in place on the axle, Fig. 2 is a detail side view of the driving or impact member, Fig. 3 is an end view thereof, Fig. 4 is a detail side view of one of the various sized sockets, and Fig. 5 is an end view thereof.

The rear axles of automobiles and similar automotive vehicles are usually journaled in a housing, the ends of the axle projecting therethrough, each end being tapered and terminating in a reduced threaded section which is adapted to receive a hub cap in the usual manner, the hub being forced and keyed on this tapered portion for solidly securing it in position, its removal therefore is quite difficult excepting when loosened by a blow or jar, obviously this blow or jar must be on a line parallel to the axis of the shaft and must therefore be delivered to the end of the threaded section, and it is very important that the force of the blow be on the end of the axle and not on the threads, otherwise the threads would be injured and the nut and hub cap could not be replaced, and I have therefor designed a simple and economical tool which protects the threads, and by means of which the blow or jar is directed to the solid section of the threaded end.

Referring now particularly to the drawing in which I have shown the preferred embodiment of my invention, the numeral 1 indicates the tapered end of a vehicle axle shaft which terminates in a threaded section 2 as above described. After a hub 3 has been forced on this tapered shaft and has been in position for a length of time it ofttimes rusts in place making it very difficult to displace, excepting by a heavy blow or jar imparted in a direction parallel to the axis of the axle as above described.

This I accomplish by providing a socket member 4 internally bored as shown to form a cylindrical chamber 5 in which an impact or driving member 6 is seated, the lower end of this chamber being tapered as shown at 7 and communicates with a restricted opening 8 which is threaded to receive the end of the threaded axle section 2, a set screw 9 being provided for holding the driving member in position in the socket.

The impact or driving member 6 is preferably cylindrical in shape, the end being tapered to correspond to the taper in the socket, said taper terminating in a restricted turned shoulder 10, the tip of which is slightly rounded and butts against the end of the axle when the tool is in position for removing a wheel.

An opening 11 is provided in the member 6 near its upper end and a short rod section 12 is secured thereon to facilitate the turning and tightening of the socket on the axle. A circular slot 13 is provided intermediate the ends of the impact member for engagement by the setscrew when it is tightened, and a centrally disposed passage 14 is provided through the said member, the lower end of said passage being restricted as shown at 15. This passage insures absolute contact between the driving member and the end of the axle as grease, dirt or other foreign matter can be forced through said opening.

In practise when removing a wheel, the socket 4 having a driving member secured therein is threaded onto the threaded section of the axle until the rounded end of the driving member butts against the end thereof, the driving member is then struck with a hammer or similar tool, until the shock loosens the hub so that the wheel can be removed, this can in no manner injure the threads on the axle as the driving member butts directly against the solid end of the axle which receives the force of impact, further, no vacuum is created, nor can dirt or grease wedge between the driving member and the axle, the tapered bottom in the chamber provides space for caked grease and dirt, which might otherwise form a cushion, making a sharp blow impossible.

For each different size of axle, a different socket member is employed, the threaded opening being made to fit, the chamber in each socket being of the same diameter, so that but one driving member is required for all of the sockets, which effects a substantial saving in labor and material, the outer surface of the socket is hexagon in shape and is designed to fit the hub cap, shaft nut, front wheel nut and cone so that the tool serves for a number of purposes.

From the foregoing description it will be obvious that I have perfected a very simple, substantial and efficient tool for removing wheels and other purposes.

What I claim is:—

1. A wheel puller comprising a shell having an enlarged bore or chamber terminating in a tapered bottom, a restricted threaded opening in said bottom and adapted to fit the threaded end of an axle, a driving member mounted in said socket and having a reduced shoulder adapted to butt against the end of said axle.

2. A wheel puller comprising a shell provided with an enlarged chamber therein, the lower end terminating in a restricted threaded opening adapted to fit the threaded end of an axle, a driving member detachably secured in the socket, and having a turned end adapted to fit against the end of the axle.

3. In a tool of the class described, comprising a shell having a threaded opening adapted to fit the threaded end of an axle shaft, a chamber in said shell and having a tapered bottom, a driving member mounted therein and provided with a tapered end terminating in a shoulder adapted to engage the end of the axle.

4. In a tool of the class described comprising a shell having a threaded opening therein, a chamber in said shell and having a tapered bottom, a driving member detachably mounted in said chamber, one end being tapered the same as the shell and terminating in a shoulder of less diameter than the threaded opening, a transversely disposed handle in the opposite end of said member, and a set-screw for securing the driving member in the shell.

5. In a tool of the class described, a shell having a threaded opening therein, a chamber in the shell and having a tapered end, a driving member detachably mounted in said chamber and having a tapered bottom terminating in a shoulder of reduced diameter, a transversely disposed handle in the opposite end of the driving member, and means on the shell for holding said driving member in position.

In testimony whereof I affix my signature.

FRED AUGUST LUTHY.